United States Patent
Speer et al.

(10) Patent No.: US 11,161,954 B2
(45) Date of Patent: Nov. 2, 2021

(54) ISOCYANATE-FREE FOAM USING CARBON MICHAEL ADDITION CHEMISTRY

(71) Applicant: Cryovac, LLC, Charlotte, NC (US)

(72) Inventors: Drew Speer, Simpsonville, SC (US);
William Mahon, Southbury, CT (US);
Sina Behtash, Kenosha, WI (US);
Kolawole Ayinuola, Greer, SC (US);
Xingwu Wang, Chapel Hill, NC (US)

(73) Assignee: Cryovac, LLC, Charlotte, NC (US)

( * ) Notice: Subject to any disclaimer, the term of this patent is extended or adjusted under 35 U.S.C. 154(b) by 166 days.

(21) Appl. No.: 16/485,514

(22) PCT Filed: Feb. 14, 2018

(86) PCT No.: PCT/US2018/018170
§ 371 (c)(1),
(2) Date: Aug. 13, 2019

(87) PCT Pub. No.: WO2018/152194
PCT Pub. Date: Aug. 23, 2018

(65) Prior Publication Data
US 2020/0148850 A1    May 14, 2020

Related U.S. Application Data

(60) Provisional application No. 62/458,780, filed on Feb. 14, 2017.

(51) Int. Cl.
*C08J 9/14* (2006.01)
*C08F 222/10* (2006.01)
*B65D 81/32* (2006.01)
*C08F 222/14* (2006.01)

(52) U.S. Cl.
CPC .......... *C08J 9/144* (2013.01); *B65D 81/3266* (2013.01); *C08F 222/102* (2020.02); *C08F 222/14* (2013.01); *C08J 2201/022* (2013.01); *C08J 2203/162* (2013.01); *C08J 2335/02* (2013.01)

(58) Field of Classification Search
CPC .......................... C08J 9/144; C08J 2201/022; C08J 2203/162; C08J 2335/02; C08J 2201/026; C08J 2365/00; C08J 2483/12; C08J 9/0061; C08F 222/102; C08F 222/14; B65D 81/3266; C08G 2261/135; C08G 2261/334; C08G 61/12; C08L 65/00
See application file for complete search history.

(56) References Cited

U.S. PATENT DOCUMENTS

| | | |
|---|---|---|
| 5,699,902 A | 12/1997 | Sperry |
| 5,873,221 A | 2/1999 | Sperry et al. |
| 5,899,325 A | 5/1999 | Bertram et al. |
| 5,913,603 A | 6/1999 | Sperry et al. |
| 5,996,782 A | 12/1999 | Sperry et al. |
| 6,065,636 A | 5/2000 | Sperry et al. |
| 6,272,813 B1 | 8/2001 | Sperry et al. |
| 6,629,599 B2 | 10/2003 | Sperry et al. |

(Continued)

FOREIGN PATENT DOCUMENTS

| | | |
|---|---|---|
| WO | 2013101682 | 7/2013 |
| WO | 2015142564 | 9/2015 |

*Primary Examiner* — Kara B Boyle
(74) *Attorney, Agent, or Firm* — Jason R. Womer

(57) ABSTRACT

A seating device has a seating platform and at least one leg supporting it in its elevated position.

19 Claims, 10 Drawing Sheets

(56) References Cited

U.S. PATENT DOCUMENTS

| | | | |
|---|---|---|---|
| 6,712,201 B1 | 3/2004 | Bertram et al. | |
| 6,862,868 B2 | 3/2005 | Sperry et al. | |
| 6,974,025 B2 | 12/2005 | Bertram et al. | |
| 6,983,839 B2 | 1/2006 | Bertram et al. | |
| 7,919,540 B2* | 4/2011 | Heuts | C08J 9/146 521/99 |
| 8,604,091 B2 | 12/2013 | Olang | |
| 9,359,471 B2* | 6/2016 | Trumbo | C08J 9/125 |
| 2008/0281006 A1* | 11/2008 | O;Leary | C08J 9/146 521/76 |
| 2012/0183694 A1 | 7/2012 | Olang | |
| 2014/0343182 A1* | 11/2014 | Jin | C08J 9/146 521/149 |
| 2015/0024138 A1 | 1/2015 | Figovsky et al. | |

* cited by examiner

ISOCYANATE-FREE FOAM USING CARBON MICHAEL ADDITION CHEMISTRY

TECHNICAL FIELD

The presently disclosed subject matter relates generally to methods of making isocyanate-free foam.

BACKGROUND

It is known to produce foam from a reactive mixture of one or more polyols and one or more isocyanates. Isocyanates are highly reactive and toxic chemicals and new warning label requirements are being implemented. It may be desirable to move away from the use of isocyanates where there is a potential for consumer exposure. There are foams that use alternate chemistries to produce urethane linkages without using isocyanates. Foam can be produced using carbon-Michael chemistry. The reaction of one or more multifunctional acrylate compounds (Michael acceptors) with one or more multifunctional Michael donors in the presence of a catalyst and a blowing agent can produce a polymeric foam. The presently disclosed matter offers an isocyanate-free foam that does not rely on urethanes to produce the foam and methods of making the isocyanate-free foam.

SUMMARY

The presently disclosed subject matter is directed to a method of making a foam and the foam thereof. In some embodiments, the formulation for making the foam may have a first part, where the first part may have 50% to 90% of at least one multifunctional carbon Michael acceptor and 10% to 45% of a physical blowing agent. The first part may have at least one solvent. In some embodiments, the formulation for making the foam may have a second part, where the second part may have 50% to 90% of at least one multifunctional carbon Michael donor and 1% to 5% of at least one solvent. The second part may have a physical blowing agent. The formulation may have 0.5% to 5% of at least one surfactant. The at least one surfactant may be in at least one of the first part and the second part.

In some embodiments, the method of making a foam may include providing a formulation as described above. The method of making a foam may also include combining the first part and the second part of the formulation in the presence of at least one carbon Michael addition catalyst. The method of making a foam may further include curing the formulation to produce a foam.

In some embodiments, the formulation for making the foam may have a first part, where the first part may have 50% to 90% of at least one multifunctional carbon Michael acceptor and 30% to 60% of at least one multifunctional carbon Michael donor. The first part may have at least one solvent. In some embodiments, the formulation for making the foam may have a second part, where the second part may have at least one carbon Michael addition catalyst and 1% to 5% of at least one solvent. The second part may have a physical blowing agent. The formulation may have 0.5% to 5% of at least one surfactant. The at least one surfactant may be in at least one of the first part and the second part.

In some embodiments, the method of making a foam may include providing a formulation as described above. The method of making a foam may also include combining the first part and the second part of the formulation. The method of making a foam may further include curing the formulation to produce a foam.

In other embodiments, the disclosed subject matter may be directed to a package. The package may have a first compartment having a first part of a formulation having 50% to 90% of at least one multifunctional carbon Michael acceptor and 30% to 60% of at least one multifunctional carbon Michael donor. The package may have a second compartment having a second part of a formulation having at least one carbon Michael addition catalyst, 1% to 5% of at least one solvent, and 0.5% to 5% of at least one surfactant. The second compartment may also have a blowing agent. The at least one surfactant may be included in at least one of the first part of a formulation and the second part of a formulation. The first and second compartments may be separated by a seal. The seal may be a frangible seal.

DESCRIPTION OF EMBODIMENTS

Figure 1:
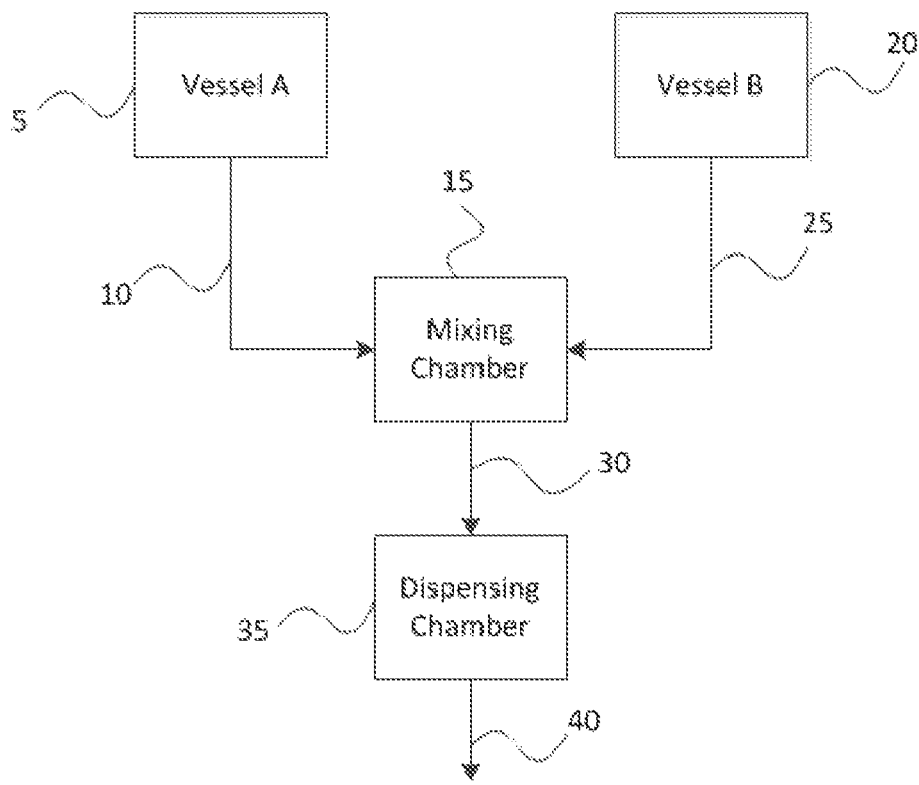
FIG. 1 is a representative schematic diagram of an embodiment of the presently disclosed subject matter.

The presently disclosed subject matter is directed to a formulation and method for making a foam. The formulation may include at least one multifunctional carbon Michael acceptor, a physical blowing agent, at least one multifunctional carbon Michael donor, and at least one solvent. The formulation may also have at least one surfactant.

The subject matter also involves the use of ingredients with functional groups that result in a carbon Michael addition reaction. A Michael addition reaction refers to the conjugate addition of a carbanion, enolate, enamine or other carbon nucleophile to an α,β-unsaturated compound at the β-carbon. This results in a new carbon-carbon bond at the β-carbon. The reaction between the Michael donor and the Michael acceptor is believed to occur in the presence of a base catalyst (carbon Michael addition catalyst), where the donor is an activated methylene compound.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a formulation" includes a plurality of such formulations, and so forth.

Unless indicated otherwise, all numbers expressing quantities of components, reaction conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, in some embodiments ±0.1%, and in some embodiments ±0.01%, from the specified amount, as such variations are appropriated in the disclosed package and methods.

As used herein, the term "additive" refers to any substance, chemical, compound or formulation that is added to an initial substance, chemical, compound or formulation in a smaller amount than the initial substance, chemical, compound or formulation to provide additional properties or to change the properties of the initial substance, chemical, compound or formulation.

As used herein, "acrylate" includes acrylates, methacrylates, and molecules having combinations of acrylate and methacrylate functionalities. "Acrylate functionality" includes functionality provided by any of acrylate and methacrylate moieties. "Acrylate moieties" includes acrylate and methacrylate moieties. As used in this context, "acrylate functionality" refers to the number of acrylate moieties on the molecule. Useful molecules having acrylate functionality for use as polymerizable resin may have an acrylate functionality of any one of 3, at least 3, 4 and 5 or more.

As used herein, "co-reactant" is a molecule having two sites of ethylenic unsaturation that participate in forming covalent bonds during the step growth polymerization (i.e., have a functionality of two). The co-reactant may be a reactive diluent, that is, a co-reactant that can act to lower the viscosity of a solution comprising the multifunctional acrylate (i.e., act as a solvent or diluent for the multifunctional acrylate). A co-reactant may be selected to improve one or more characteristics of the cured foam, such as tensile strength, compressive strength, toughness, and/or modulus.

As used herein, "froth" is the expanded mixture at the initial period of the curing process (i.e., polymerization process) comprising the polymerizable resin, co-reactants, and other components and a plurality of cells within the mixture created by the blowing agent that have come out of solution or have vaporized in response to the decrease in pressure. The froth exists before curing has been completed.

As used herein, "Michael donor" refers to a Michael reaction nucleophile. A "Michael donor" is a compound with at least one Michael donor functional group, which is a functional group containing at least one Michael active hydrogen atom, which is a hydrogen atom attached to a carbon atom that is located between two electron-withdrawing groups such as C═O and/or a cyano group. A compound with two or more Michael active hydrogen atoms is known herein as at least one multifunctional carbon Michael donor. A Michael donor may have one, two, three or more separate functional groups that each contains one or more Michael active hydrogen atoms. For example, trimethylolpropane tris(acetoacetate), neopentyl glycol bis(acetoacetate), cyclohexanedimethanol bis(acetoacetate), pentaerythritol tetrakis (acetoacetate), glycerol tris(acetoacetate) and the corresponding acetoacetamides.

As used herein, "Michael acceptor" refers to a Michael reaction electrophile. A "Michael acceptor" is a compound with an electron deficient carbon-carbon double bond. Michael acceptors can be α,β-unsaturated ketones, and also esters; nitriles; sulfones; and compounds with activated double bonds can act as Michael acceptors. For example, vinyl ketones, alkyl acrylates, acrylonitrile, fumarates, etc., can be Michael acceptors.

All formulation percentages used herein are presented on a "by weight" basis, unless designated otherwise.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

The presently disclosed subject matter is directed to a formulation for making a foam and methods of making a foam. The formulation may include at least one multifunctional carbon Michael acceptor, a physical blowing agent, at least one multifunctional carbon Michael donor, at least one solvent, and a surfactant. The formulation may be in two parts: a first part and a second part. The first part may be referred to as the A-side, A part or A. The second part may be referred to as the B-side, B part or B. The formulation for making a foam may have two parts: the first part may have at least one multifunctional carbon Michael acceptor and a physical blowing agent; and the second part of the formulation for making a foam may have at least one multifunctional carbon Michael donor and at least one solvent. The first part may also have at least one solvent. The second part may have at least one carbon Michael addition catalyst. The second part may also have a physical blowing agent. Additionally, the formulation may have a surfactant, which may be in the first part, the second part or both the first and the second part.

In another embodiment, the first part may have at least one multifunctional carbon Michael acceptor and at least one carbon Michael donor, at least one surfactant, and at least one solvent, and the second part may comprise the carbon Michael addition catalyst, at least one surfactant, and at least one solvent. There may be a blowing agent in at least one of the first part and the second part. In further embodiments, the first part may have at least one multifunctional carbon Michael acceptor and at least one multifunctional carbon Michael donor, and the second part may have at least one carbon Michael addition catalyst. In even further embodiments, the first part may have at least one multifunctional carbon Michael acceptor, at least one multifunctional carbon Michael donor, and at least one surfactant, and the second part may have at least one carbon Michael addition catalyst, at least one polyol, a polar aprotic solvent, a physical blowing agent, and a polar protic solvent. The first part and the second part may be isolated from one another until mixing the first part and the second part is desired.

The invention is directed to a two-part, on-demand isocyanate-free foam based on carbon Michael addition chemistry. This foam may be suitable for use in packaging applications. The beneficial use of polar solvents was discovered in the disclosed formulations. In particular, protic polar solvents, such as water, provide a distinct benefit in the disclosed formulations by reducing compressive strength to a desired range (less than 10 psi at 10% strain). In addition, a polar protic solvent in conjunction with a polar aprotic solvent such as triethylphosphate (TEP) may provide lower density foam with good compressive strength (>1<10 psi at 10% strain). The A-side component (first part) of the formulation may have at least one multifunctional carbon Michael acceptor such as multifunctional acrylates and a physical blowing agent. The B-side component (second part) may have at least one multifunctional carbon Michael donor, such as acetoacetate esters or amides, a carbon Michael addition catalyst and a physical blowing agent. The B-side further comprises an aprotic polar solvent and a protic polar solvent, for example, triethylphosphate and water. Both components may further comprise surfactants.

The formulation for making a foam may include at least one multifunctional carbon Michael acceptor. The at least one multifunctional carbon Michael acceptor may be at least one multifunctional acrylate. The at least one multifunctional acrylate may be polypropylene glycol diacrylate, dipropylene glycol diacrylate, dipentaerythritol pentaacrylate, dipentaerythritol hexaacrylate, polyethylene glycol diacrylate, PEG 400 diacrylate, PEG 600 diacrylate, polyethylene glycol dimethacrylate, trimethylolpropane triacrylate, ethoxylated trimethylolpropane triacrylate, tripropylene glycol diacrylate, di(trimethylolpropane) tetraacrylate, pentaerythritol tetraacrylate, pentaerythritol triacrylate, bisphenol A glycolate diacrylate, ethoxylated bisphenol A diacrylate, ethoxylated neopentyl glycol diacrylate, epoxy acrylates, polyester acrylates and combinations thereof. The at least one multifunctional carbon Michael acceptor may be acrylate monomers and oligomers with the functionality from 1 to 5 and the structures of epoxy, urethane, aliphatic, aromatic, bio-based, polyether, polyester, etc. The at least one multifunctional carbon Michael acceptor may be dipropylene glycol diacrylate. The at least one multifunctional carbon Michael acceptor may be dipentaerythritol pentaacrylate. The at least one multifunctional carbon Michael acceptor may be PEG 400 diacrylate. The at least one multifunctional carbon Michael acceptor may be dipropylene glycol diacrylate, dipentaerythritol pentaacrylate and PEG 400 diacrylate. The at least one multifunctional carbon Michael acceptor may be trimethylolpropane triacrylate, and dipentaerythritol pentaacrylate.

In some embodiments, the formulation may have 50% to 90% of at least one multifunctional carbon Michael acceptor. The formulation may have 50%, 55%, 60%, 65%, 70%, 75%, 80%, 85%, and 90% of at least one multifunctional carbon Michael acceptor or any range between these values. In some embodiments, the formulation may have 84% of at least one multifunctional carbon Michael acceptor. The formulation may have 6.2% dipropylene glycol diacrylate, 44.8% dipentaerythritol pentaacrylate and 33% PEG 400 diacrylate. The A-side component may have 54.40% trimethylolpropane triacrylate and 9.00% dipentaerythritol pentaacrylate.

The formulation for making a foam may include at least one multifunctional carbon Michael donor. The at least one multifunctional carbon Michael donor may be an acetoacetate ester, an acetoacetamide, non-ester/amide based internal or terminal acetoacetyl-containing compounds, acetoacetyl terminated oligomers, and combinations thereof. The at least one multifunctional carbon Michael donor may be neopentyl glycol bis(acetoacetate), di(trimethylolpropane) tetrakis(acetoacetate), glycerol tris(acetoacetate), 1,4-cyclohexanedimethanol bis(acetoacetate), pentaerythritol tetrakis(acetoacetate), propane-1,1,1-triyltrimethyl tris(acetoacetate) or combinations thereof. In some embodiments, the at least one multifunctional carbon Michael donor may be propane-1,1,1-triyltrimethyl tris(acetoacetate).

In some embodiments, the formulation may have 50% to 90% of at least one multifunctional carbon Michael donor. The formulation may have 30% to 60% of at least one multifunctional carbon Michael donor. The formulation may have 30%, 35%, 40%, 45%, 48%, 50%, 55%, 60%, 65%, 70%, 75%, 80%, 85%, and 90% of at least one multifunctional carbon Michael donor or any range between these values. In some embodiments, the formulation may have 62.5% of at least one multifunctional carbon Michael donor. In some embodiments, the formulation may have 48% of at least one multifunctional carbon Michael donor. The formulation may have 62.5% of trimethylolpropane tris(acetoacetate) (AATMP). In some embodiments, the formulation may have less than 50% of at least one multifunctional carbon Michael donor.

In some embodiments, the formulation may have a ratio of at least one multifunctional carbon Michael acceptor to at least one multifunctional carbon Michael donor. The ratio of at least one multifunctional carbon Michael acceptor to at least one multifunctional carbon Michael donor may be 0.9 to 1.6. The ratio of at least one multifunctional carbon Michael acceptor to at least one multifunctional carbon Michael donor may be 0.9, 1.0, 1.1, 1.2, 1.3, 1.4, 1.5, 1.6 or any range between these values.

The formulation for making a foam may include a physical blowing agent. The physical blowing agent may be 1,1,1,4,4,4-hexafluorobut-2-ene, 1,1,1,3,3-pentafluoropropane, trans-1-chloro-3,3,3-trifluoropropene, 2,3,3,3-tetrafluoropropene, trans-1,3,3,3-tetrafluoropropene, methyl acetate, pentane, butane, isobutane, dimethyl ether, isobutene, dimethoxymethane and combinations thereof. In some embodiments, the physical blowing agent may be any physical blowing agent listed in Table 1 below.

TABLE 1

| Tradename | Description | b.p. (C.) | d (g/cc) | v.p. (mmHg) @ 20 C. | psia @ 20 C. |
|---|---|---|---|---|---|
| water | water | 100 | 1 | 17.5 | 0.34 |
| acetone | acetone | 56 | 0.791 | 184.0 | 3.56 |
| methyl acetate | methyl acetate | 57 | 0.932 | 165.0 | 3.19 |
| methyl formate | methyl formate | 33 | 0.974 | 483.0 | 9.34 |
| FEA-1100 | 1,1,1,4,4,4-hexafluorobut-2-ene | 33 | | | 0.00 |
| HFC-245fa | 1,1,1,3,3-pentafluoropropane | 15 | 1.32 | 923.0 | 17.85 |
| Solstice LBA | trans-1-chloro-3,3,3-trifluoropropene | 19 | 1.27 | | 0.00 |
| n-pentane | n-pentane | 35-36 | 0.626 | 428.0 | 8.28 |
| cyclopentane | cyclopentane | 50 | 0.751 | 275.0 | 5.32 |
| petroleum ether | pentanes | 30-60 | 0.64 | 413.0 | 7.99 |
| HFC-134a | 1,1,1,2-tetraflurorethane | −26.1 | 1.206 | | 96 |
| HFC-152a | 1,1-difluoroethane | −24.2 | 0.898 | 4020.0 | 86 |
| HCFC-22 | chlorodifluoromethane | −40.8 | 1.19 | | 151 |
| isobutane | 2-methylpropane | −12 | 2.064 | | 72 |
| butane | n-butane | −0.5 | 0.579 | | 52 |
| methyl ether | dimethyl ether | −24.8 | 0.666 | 7760.0 | 150.05 |
| isobutene | 2-methylpropene | −6.9 | | 3278.0 | 63.39 |
| R-1234yf | 2,3,3,3-tetrafluoropropene | −29 | 1.1 | | 87 |
| Solstice ze | trans-1,3,3,3-tetrafluoropropene | −19 | 1.18 | | 71 |
| dimethoxy-methane | dimethoxymethane | 42 | 0.859 | | |

In some embodiments, the physical blowing agent may be trans-1-chloro-3,3,3-trifluoropropene. The physical blowing agent may have a boiling point in the range of −30° C. to 100° C. The physical blowing agent may have a boiling point of −20° C. to 45° C. The physical blowing agent may have a vapor pressure of 0 to 100 psia at 20° C. The physical blowing agent may have a vapor pressure of 0.1 to 75 psia at 20° C.

The formulation for making a foam may have 10% to 45% of a physical blowing agent. The formulation may have 10%, 15%, 20%, 25%, 30%, 35%, 40%, and 45% of a physical blowing agent or any range between these values. The formulation may have 40% trans-1-chloro-3,3,3-trifluoropropene. The formulation may have 25% trans-1-chloro-3,3,3-trifluoropropene in the first part. The formulation may have 15% trans-1-chloro-3,3,3-trifluoropropene in the second part. The formulation may have 25% trans-1-chloro-3,3,3-trifluoropropene in the first part and 15% trans-1-chloro-3,3,3-trifluoropropene in the second part.

The formulation for making a foam may include at least one solvent. The at least one solvent may be an aprotic polar solvent, a protic polar solvent, and combinations thereof. The aprotic polar solvent may be acetone, acetonitrile, dichloromethane, tetrahydrofuran (THF), dimethyl sulfoxide (DMSO), ethyl acetate, N,N-dimethylformamide (DMF). In some embodiments, the aprotic polar solvent may be triethyl phosphate. The protic polar solvent may be acetic acid, ethanol, methanol, n-propanol, t-butanol, water and combinations thereof. In some embodiments, the protic polar solvent may be water. The formulation may have an aprotic polar solvent and a protic polar solvent. The formulation may have an aprotic polar solvent and a protic polar solvent in the second part (B-side). The formulation may have an aprotic polar solvent on the A-side and a protic polar solvent in the second part (B-side).

In some embodiments, the first part may have at least one solvent that is a protic polar solvent and an aprotic polar solvent and the second part may have at least one solvent that is a protic polar solvent. In other embodiments, the first part may have at least one solvent that is a protic polar solvent and an aprotic polar solvent and the second part may have at least one solvent that is an aprotic polar solvent. In further embodiments, the first part may have at least one solvent that is a protic polar solvent and the second part may have at least one solvent that is an aprotic polar solvent and a protic polar solvent. In yet further embodiments, the first part may have at least one solvent that is an aprotic polar solvent and the second part may have at least one solvent that is an aprotic polar solvent and a protic polar solvent.

The formulation may have 1.0% to 5.0% of at least one solvent. The formulation may have 1.0%, 1.5%, 2.0%, 2.5%, 3.0%, 3.5%, 4.0%, 4.5%, 5.0% of at least one solvent or any range between these values. The formulation may have 2% of an aprotic polar solvent and 2% of a protic polar solvent in the second part. The formulation may have 2% triethyl phosphate and 2% water in the second part. For the purposes of shelf stability of the A and B parts, the aprotic solvent would be on the A-side with all of the hydrolyzable esters, and the protic solvent on the B-side with the base catalyst.

The formulation for making a foam may include at least one surfactant. The surfactant may be in at least one of the first part and the second part. The surfactant may be in the first part. The surfactant may be in the second part. The surfactant may be in the first part and the second part. The surfactant may be a polysiloxane-polyalkylene oxide copolymer. The surfactant may be a polysiloxane-polyalkylene oxide block copolymer.

The formulation may have 0.5% to 5% of at least one surfactant. The formulation may have 0.5%, 1.0%, 1.5%, 2.0%, 2.5%, 3.0%, 3.5%, 4.0%, 4.5%, and 5.0% of at least one surfactant or any range between these values. The formulation may have 2.5% surfactant in the first part. The formulation may have 1.05% surfactant in the second part. The formulation may have 2.5% surfactant in the first part and 1.05% surfactant in the second part.

The formulation for making a foam may include at least one carbon Michael addition catalyst. The carbon Michael addition catalyst may be 1,1,3,3-tetramethylguanidine (TMG), 1,8-diazabicyclo[5.4.0]undec-7-ene, 1,5-diazabicyclo[4.3.0]non-5-ene, 1,3,5-Triazabicyclo[4.4.0]dec-5-ene, tetrabutylammonium hydroxide, aqueous potassium hydroxide and combinations thereof. In some embodiments, the formulation may include 1% to 10% of a carbon Michael addition catalyst. The formulation may include 1.0%, 1.35%, 1.5%, 2.0%, 2.5%, 3.0%, 3.5%, 4.0%, 4.5%, 5.0%, 5.3%, 5.5%, 6.0%, 6.5%, 7.0%, 7.5%, 8.0%, 8.5%, 9.0%, 9.5%, 9.6%, 10% of a carbon Michael addition catalyst or any range between these values. In some embodiments, the formulation may include 5.3% TMG.

The formulation for making a foam may have at least one additive. In some embodiments, the formulation may include 0.005 wt %, 0.007 wt %, 0.008 wt %, 0.01 wt %, 0.05 wt %, 0.075 wt %, 0.1 wt %, 0.2 wt %, 0.5 wt %, 0.75 wt %, 1.0 wt %, 1.2 wt %, 1.4 wt %, 1.44 wt %, 1.75%, 1.8 wt %, 1.82%, 1.83 wt %, 2.0 wt %, 3.0 wt %, 4.0%, 4.5 wt %, 4.6 wt %, 4.62 wt %, 5.0 wt %, 5.25 wt %, 5.3 wt %, 5.32 wt %, 5.5 wt %, 6 wt %, 7 wt %, 10 wt % of at least one additive or any range between any of these values. The at least one additive may be in the first part. The formulation may have at least one additive in the second part. The formulation may have at least one additive in the first part and the second part.

The at least one additive may be a dye, flame retardant, pigment dispersing agent, filler, reinforcing agent, nucleating agent, surfactant, unsaturated polyester type resin or combinations thereof. In some embodiments, the at least one additive may be a dye and a pigment dispersing agent. In other embodiments, the at least one additive may be a dye, a pigment dispersing agent and a silicon surfactant.

The formulation for making a foam may include at least one polyol. The at least one polyol may be a polyether polyol-copolymer of ethylene oxide and propylene oxide, with 1 to 8 hydroxyl groups per molecule. The at least one polyol may have a number average molecular weight of 400 to 10000. The at least one polyol may be any one of the following commercial products: Arcol LHT-240 of Covestro, Multranol 3901 of Covestro, Voranol 3150 of Dow, Voranol 3136 of Dow, and Voranol 550 of Dow. The formulation may have Multranol 3901 and Voranol 410 in the second part. The formulation may have Voranol 415 and Arcol F-1080 in the second part.

Methods of Making the Disclosed Formulation

The method of making a foam may include providing the formulation mentioned previously. FIG. 1 represents an embodiment of a method of making the foam. As seen in FIG. 1, the first part may be in vessel A 5, and the second part may be in vessel B 20. The first part may be transported to a mixing chamber 15 by stream 10 that connects vessel A 5 to the mixing chamber 15. The second part may be transported to a mixing chamber 15 by stream 25 that connects vessel B 20 to the mixing chamber 15.

Additionally, the method of making a foam may include combining the first part and the second part in the presence of a carbon Michael addition catalyst. The first part and the second part may be prepared separately. The first part and the second part may be mixed together in the mixing chamber 15. A stream of the first part, for example, in stream 10 may be impinged or entrained with a stream of the second part, for example, in stream 25. Also by example, a stream of the second part, for example, in stream 25 may be impinged or entrained with a stream of the first part, for example, in stream 10. The foam may be formed by mixing the first part and the second part in any manner suitable including pressurized systems with or without static mixers, impingement mixing, heated dispensing systems, and simple hand mixing at room temperature. The first part and the second part may be hand mixed. The first part and the second part may be mixed with a mixing device. The mixing device may be a static mixing device. The mixing device may be a disposable mixing device. In some embodiments, the step of combining is performed with a static mixer. The step of combining the first part and the second part may be mixed for 5-60 seconds at 1500 rpm.

The step of combining the first part and the second part may be done at various ratios. In some embodiments, the step of combining may be done at an A (first part) to B (second part) ratio of 1:1. In other embodiments, the step of combining may be done at an A to B ratio of 1:0.5. In other embodiments, the step of combining may be done at an A to B ratio of 0.5:1. The A:B ratio may be 0.5:1 to 1:0.5, or any ratio between these values.

The step of combining the first part and the second part may be done at various temperatures. In some embodiments, the step of combining may be done at ambient temperature. In other embodiments, the step of combining may be done at a temperature of 10° C. to 60° C. The temperature may be 10° C., 15° C., 20° C., 25° C., 30° C., 35° C., 40° C., 45° C., 50° C., 55° C., 60° C., or any range between these values.

Simultaneously or soon after the mixing, the resulting mixture in stream 30 may be expanded to create a froth. The froth may be transported to a dispensing chamber 35 by stream 30 that connects the mixing chamber 15 to the dispensing chamber 35. The dispensing chamber 35 may dispense the froth using stream 40.

The first part and the second part may be combined at a mixing pressure of, for example, at least any one of 100 psig (689.48 kPa), 200 psig (1378.95 kPa), 300 psig (2068.43 kPa), 350 psig (2413.17 kPa), 500 psig (3447.38 kPa), and 800 psig (5515.81 kPa), for example in mixing chamber 15 to form a resulting mixture. The resulting mixture may have a temperature, for example, of at least 10° C., 20° C., 30° C., 40° C., 50° C., and 60° C. or any range between these values. The curing reaction begins upon mixing, for example, within the mixing chamber 15.

In some embodiments the platform may be a Quick and Simple platform. In a Quick and Simple platform, the pressures will initially be at ambient atmospheric conditions, however, upon heating or the exotherm developed during mixing, the pressure within a Quick pouch will be higher than atmospheric up to the point where the frangible seal breaks open. The internal pouch pressure will be higher than atmospheric pressure.

The step of expanding the resulting mixture in stream 30 to create the froth may occur by discharging the mixture directly from the mixing chamber 15 to ambient conditions (not illustrated), or alternatively by discharging the mixture into a dispensing chamber 35. In the latter case, the froth may then be discharged from the dispensing chamber 35 to allow the curing process to proceed to completion and create the foam outside of the dispensing chamber.

The polymerizable resins along with any of the additional ingredients within the froth are cured to create a solidified matrix surrounding or encasing the cellular structure of the plurality of cells to create the foam. The temperature of the mixture or froth may be elevated in a controlled fashion to help control the rate of the curing reaction, as well as potentially extending the curing reaction. Typically, the curing is exothermic, so that the temperature of the system will rise after initiation of the curing reaction. The curing may be 10 seconds, 20 seconds, 30 seconds, 40 seconds, 50 seconds, 1 minute, 2 minutes, 3 minutes, 4 minutes or any range between these values. In some embodiments, the foam may be tack free in 2 minutes or less. In other embodiments, the foam may be tack free in 2 minutes, 110 seconds, 100 seconds, 90 seconds, 80 seconds, 70 seconds, 60 seconds, 50 seconds, 40 seconds, 30 seconds, 20 seconds, 10 seconds or any range between these values.

The method of making a foam may include providing a formulation. The formulation may have a first part comprising 50% to 90% of at least one multifunctional carbon Michael acceptor and 10% to 45% of a physical blowing agent. The first part may have at least one solvent. The second part may have 50% to 90% of at least one multifunctional carbon Michael donor and 1% to 5% of at least one solvent. The second part may have a physical blowing agent. The formulation may have 0.5% to 5% of at least one surfactant. The at least one surfactant may be included in at least one of the first part and the second part. The method of making a foam may include combining the first part and the second part in the presence of a carbon Michael addition catalyst. The method of making a foam may include combining a first part and a second part in the presence of a carbon Michael addition catalyst. The method of making a foam may include curing the formulation to produce a foam.

In some embodiments, the method of making a foam may further include the step of pressurizing the first part. In other embodiments, the method of making a foam may further include the step of pressurizing the second part. The method of making a foam may further include the step of separately pressurizing the first part and the second part. In some embodiments, the method of making a foam may further include the step of depressurizing the first part such that the first part at least partially expands due to expansion of the blowing agent. In other embodiments, the method of making a foam may further include the step of depressurizing the second part such that the second part at least partially expands due to expansion of the blowing agent. The method of making a foam may further include the step of separately depressurizing the first part and the second part such that the first part and the second part each at least partially expand due to expansion of the blowing agent.

Foam

The foam may be a reaction product of the methods described above. The foam may have at least one multifunctional carbon Michael donor, at least one multifunctional carbon Michael acceptor, at least one surfactant, at least one carbon Michael addition catalyst, a protic polar solvent, an aprotic polar solvent, and a blowing agent. In some embodiments, the foam may have 10% to 60% of at least one multifunctional carbon Michael donor, 10% to 60% of at least one multifunctional carbon Michael acceptor, 0.5% to 2.5% of at least one surfactant, 0.01% to 7.5% of at least one carbon Michael addition catalyst, 0.5% to 5% of a protic polar solvent, 0.01% to 5% of an aprotic polar solvent, and 5% to 30% of a blowing agent. In some embodiments, the foam may not have an aprotic polar solvent. In some embodiments, the foam may have 10% to 60% of at least one multifunctional carbon Michael donor, 10% to 60% of at least one multifunctional carbon Michael acceptor, 0.5% to 2.5% of at least one surfactant, 0.01% to 7.5% of at least one carbon Michael addition catalyst, 0.5% to 5% of a protic polar solvent, and 5% to 30% of a blowing agent.

In other embodiments, the foam may have 6.2% dipropylene glycol diacrylate, 44.8% dipentaerythritol pentaacrylate, 33.0% PEG 400 diacrylate, 62.5% AATMP, 3.55% of a polysiloxane-polyalkylene oxide copolymer, 5.3% of TMG, 2.0% of triethyl phosphate, 40% of trans-1-chloro-3,3,3-trifluoropropene, and 2.0% water. The first part of the formulation for making a foam may have 6.2% dipropylene glycol diacrylate, 44.8% dipentaerythritol pentaacrylate, 33.0% PEG 400 diacrylate, 2.50% of a polysiloxane-polyalkylene oxide copolymer, and 25.0% of trans-1-chloro-3,3,3-trifluoropropene. The second part of the formulation for making a foam may have 62.5% AATMP, 1.05% of a polysiloxane-polyalkylene oxide copolymer, 5.3% of TMG, 2.0% of triethyl phosphate, 15.0% of trans-1-chloro-3,3,3-trifluoropropene, and 2.0% water.

The foam (i.e., cellular plastic) may have a density of less than 1.7 pcf (27.23 kg/m3). In some embodiments, the foam may have a density of 0.25, 0.5, 1.0, 1.1, 1.2, 1.3, 1.4, 1.5, 1.6, 1.65, 1.66, 1.67, 1.68, 1.69 pcf or any range between these values. For protective packaging (e.g., cushioning) applications, lower densities are preferred. Unless otherwise noted, the density of the foam as used herein is the apparent density measured according to ASTM D1622-08, which is incorporated herein in its entirety by reference.

The foam may have a compressive strength at 10% strain of less than 5 psi. In some embodiments, the foam may have a compressive strength of at least any of the following: 0.5, 0.8, 1.0, 1.1, 1.2, 1.3, 1.4, 1.5, 2.0, 2.5, 2.75, 3.0, 3.25, 3.5, 3.75, 4.0, 4.25, 4.5, 4.75, 4.8, 4.9 psi, or any range between these values. As used herein, the compressive strength is measured according to ASTM 1621-00, as modified by reference to 10% strain.

The foam may have a configuration, for example, of any of a sheet, plank, slab, block, board, and molded shape. The foam may be a solid foam. The foam may be used for any one or more of void fill, blocking or bracing, thermal insulation, cushioning, package cushioning, sound insulation or vibration dampening.

In preferred embodiments, the formulations used to make the foam are free of isocyanate reactants, such as those used in formulating polyurethane foams, so that the final foam of the present disclosure is free from isocyanates or isocyanate residues.

In some embodiments, the method of making a foam may take place in a container or package. In some embodiments, the package may have a first compartment having a first part of a formulation and a second compartment having a second part of a formulation. The first part of a formulation and the second part of a formulation were discussed above as the parts of the formulation for making a foam. The first part of a formulation may have 50% to 90% of at least one multifunctional carbon Michael acceptor and 30% to 60% of at least one multifunctional carbon Michael donor. The second part of a formulation may have at least one carbon Michael addition catalyst, 1% to 5% of at least one solvent and 0.5% to 5% of at least one surfactant. The first part of a formulation may have a blowing agent. The second part of a formulation may have a blowing agent. The at least one surfactant may be included in at least one of the first part of a formulation and the second part of a formulation. The first and second compartments are separated by a seal. The seal may be a frangible seal.

Examples of such packages are described in the following patents commonly assigned with this application; U.S. Pat. Nos. 5,699,902; 5,899,325; 5,996,782; 6,712,201; 6,974,025; 6,983,839. Each of the patents listed in the previous sentence is incorporated herein in its entirety by reference.

For the sake of clarity, any conflicting definitions and meanings of terms between this application and previous patents listed above will have the definitions and meanings of terms in this application govern over the previous patents.

In some embodiments, the method of making a foam may include providing the package mentioned previously and bursting the seal to combine the first and second parts of the formulation. The bursting of the seal to combine the first and second parts of the formulation may create a mixture. The seal may be a frangible seal. The method of making a foam may further include curing the mixture to produce a foam.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. The definitions and disclosures set forth in the present application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

EXAMPLES

The following Examples provide illustrative embodiments. In light of the present disclosure and the general level of skill in the art, those of ordinary skill in the art will appreciate that the following Examples are intended to be exemplary only and that numerous changes, modifications, and alterations can be employed without departing from the scope of the presently disclosed subject matter.

Example 1

TABLE 2

| Components | Optimum Example 1 | |
| --- | --- | --- |
| | Part A | Part B |
| Dipropylene glycol diacrylate (C-Michael acceptor) | 6.20% | |
| Dipentaerythritol pentaacrylate (C-Michael acceptor) | 44.80% | |
| PEG 400 diacrylate (C-Michael acceptor) | 33.00% | |
| AATMP (C-Michael donor) | | 62.50% |

TABLE 2-continued

|  | Optimum Example 1 | |
|---|---|---|
| Components | Part A | Part B |
| Surfactant L-6915 | 2.50% | 1.05% |
| TMG (catalyst) |  | 5.30% |
| Triethyl phosphate (aprotic polar solvent) |  | 2.00% |
| Solstice LBA-Honeywell (trans-1-chloro-3,3,3-trifluoropropene, blowing agent) | 25.00% | 15.00% |
| Water (protic polar solvent) |  | 2.00% |
| Total components | 111.50% | 87.85% |
| Density (pcf) | 1.70 | |
| Compressive Strength (psi) | 3.0 | |

This foam was subjected to transmitted shock testing in accordance with ASTM D4168. A 3 inch cushion at 0.4 psi static load subjected to a 30 inch drop height gave an average (2-5 drops) transmitted shock of 39 G. At higher static loading, the transmitted shock numbers are shown below in Table 2. Table 2 also has transmitted shock numbers at 30 inch drop height using a 2 inch cushion and replacing the PEG 400 diacrylate with a PEG 600 diacrylate.

TABLE 3

| Examples | SL (psi) | Drop 1 | Drop 2 | Drop 3 | Drop 4 | Drop 5 | Avg. 2-5 |
|---|---|---|---|---|---|---|---|
| Example 1, 3 inch | 1 | 28 | 31 | 33 | 35 | 37 | 34 |
| Example 1, 3 inch | 1.25 | 19 | 24 | 29 | 34 | 39 | 32 |
| Example 1, 2 inch | 0.75 | 32 | 40 | 46 | 52 | 56 | 49 |
| Example 1, 2 inch | 1 | 26 | 37 | 45 | 58 | 73 | 53 |

In conclusion, the polar protic and aprotic solvent show a surprising synergistic effect.

Example 2

Examples 10, 20 and 30 were tested for density and compressive strength and the formulation and results are listed in Table 3 below. Examples 10, 20 and 30 illustrate the ability to tune the compressive strength of the foam through the use of a PEG diacrylate.

TABLE 4

| | Foam Hardness | | | | | |
|---|---|---|---|---|---|---|
| | Low | | Medium | | High | |
| | Example | | | | | |
| | 10 | | 20 | | 30 | |
| Components | Part A | Part B | Part A | Part B | Part A | Part B |
| Dipropylene glycol diacrylate (Michael acceptor) | 11.00% | | 8.60% | | 0.14% | |
| Dipentaerythritol pentaacrylate (Michael acceptor) | 35.00% | | 46.40% | | 60.84% | |
| PEG 400 diacrylate (Michael acceptor) | 38.00% | | 29.00% | | 23.02% | |
| AATMP (Michael donor) | | 59.00% | | 64.40% | | 69.00% |
| Polysiloxane polyalkylene oxide copolymer (surfactant) | 2.00% | 1.05% | 2.00% | 1.05% | 2.00% | 1.05% |
| TMG (Catalyst) | | 4.44% | | 4.80% | | 5.00% |
| triethyl phosphate (aprotic polar solvent) | | 2.00% | | 2.00% | | 2.00% |
| Solstice LBA (physical blowing agent) | 19.50% | 12.22% | 19.50% | 12.22% | 19.50% | 12.22% |
| Water (protic polar solvent) | | 2.00% | | 2.00% | | 2.00% |
| Total components | 105.50% | 80.71% | 105.50% | 86.47% | 105.50% | 91.27% |
| Density (pcf)* | 3.4 | | 3.3 | | 3.0 | |
| Compressive Strength (psi)* | 1.02 | | 4.27 | | 10.16 | |

Density and Compressive Strength were measured on 1 liter cup foams with skin. Example 10 had a low foam hardness with a density of 3.4 pcf and compressive strength of 1.02 psi. Example 20 had a medium foam hardness with a density of 3.3 pcf and compressive strength of 4.27 psi. Example 30 had a high foam hardness with a density of 3.0 pcf and compressive strength of 10.16 psi. In conclusion, by decreasing the PEG 400 diacrylate an increase in compressive strength was shown. Adjusting the PEG 400 diacrylate from 38% to 23.02%, an increase of compressive strength from 1.02 to 10.16 psi was observed.

Table 4, Table 5, and Table 6 provide more formulation examples (examples 31-41) to illustrate the ability to formulate with low cost acrylates and to tune the compressive strength of the foam through the use of acrylate combinations and A:B ratios.

TABLE 5

| Components | Example 31 | | Example 32 | | Example 33 | | Example 34 | |
|---|---|---|---|---|---|---|---|---|
| | Part A | Part B | Part A | Part B | Part A | Part B | Part A | Part B |
| Dipentaerythritol pentaacrylate | 11.50% | | 14.00% | | 27.50% | | 10.00% | |
| Trimethylolpropane triacrylate | 42.00% | | 51.00% | | 27.50% | | 56.00% | |
| AATMP (Michael donor) | | 68.95% | | 68.95% | | 68.95% | | 70.00% |
| Polysiloxane polyalkylene oxide copolymer (surfactant) | 2.50% | 1.05% | 2.50% | 1.05% | 2.50% | 1.05% | 2.50% | 1.05% |
| TMG (Catalyst) | | 6.00% | | 6.00% | | 6.00% | | 6.00% |
| triethyl phosphate (aprotic polar solvent) | | 2.00% | | 2.00% | | 2.00% | | 2.00% |
| Solstice LBA (physical blowing agent) | 20.00% | 20.00% | 20.00% | 20.00% | 20.00% | 20.00% | 20.00% | 20.00% |
| Water (protic polar solvent) | | 2.00% | | 2.00% | | 2.00% | | 2.00% |
| Total components | 76.00% | 100.0% | 85.50% | 100.0% | 77.50% | 100.0% | 88.5% | 101.05% |
| A:B Ratio | 1.0 | | 1.2 | | 1.0 | | 1.2 | |
| Density (pcf)* | 1.84 | | 1.83 | | 1.95 | | 1.304 | |
| Compressive Strength (psi)* | 0.43 | | 8.41 | | 1.64 | | 2.954 | |

Density and Compressive Strength were measured on 1 liter cup foams with skin. Measurements were based on core foam; the values should be higher if measured on foam with skin. Example 31 and 32 had the same acrylate combination but different A:B ratio. The higher A:B ratio of Example 32 gave much higher compressive strength than Example 31. In the same A:B ratio, increase of the higher functionality acrylate enhanced the compressive strength, as compared by Example 33 to Example 31 and Example 32 to Example 34.

TABLE 6

| Components | Example 35 | | Example 36 | | Example 37 | | Example 38 | |
|---|---|---|---|---|---|---|---|---|
| | Part A | Part B | Part A | Part B | Part A | Part B | Part A | Part B |
| Dipentaerythritol pentaacrylate | 30.30% | | 35.00% | | 30.00% | | 24.50% | |
| Dipropylene glycol diacrylate | 30.30% | | 35.00% | | 41.00% | | 47.00% | |
| AATMP (Michael donor) | | 58.95% | | 58.95% | | 58.95% | | 58.95% |
| Polysiloxane polyalkylene oxide copolymer (surfactant) | 2.50% | 1.05% | 2.50% | 1.05% | 2.50% | 1.05% | 2.50% | 1.05% |
| TMG (Catalyst) | | 6.00% | | 6.00% | | 6.00% | | 6.00% |
| triethyl phosphate (TEP, aprotic polar solvent) | | 2.00% | | 2.00% | | 2.00% | | 2.00% |
| Solstice LBA (physical blowing agent) | 20.00% | 20.00% | 20.00% | 20.00% | 20.00% | 20.00% | 20.00% | 20.00% |
| Water (protic polar solvent) | | 2.00% | | 2.00% | | 2.00% | | 2.00% |
| Total components | 83.10% | 100.00% | 92.50% | 100.00% | 93.50% | 100.00% | 94.00% | 100.00% |
| A:B Ratio | 1.0 | | 1.2 | | 1.2 | | 1.2 | |
| Density (pcf)* | 2.40 | | 2.50 | | 2.48 | | 2.60 | |
| Compressive Strength (psi)* | 0.38 | | 1.54 | | 0.47 | | 0.36 | |

Density and Compressive Strength were measured on 1 liter cup foams with skin. Examples in Table 5 basically repeated the same results as Table 3 with different acrylate combinations. Example 36 foam showed the highest compressive strength in the group because of the combination of high functionality acrylate and high A:B ratio used.

shows that the cross product is the most significant variable on density.

Figure 4:
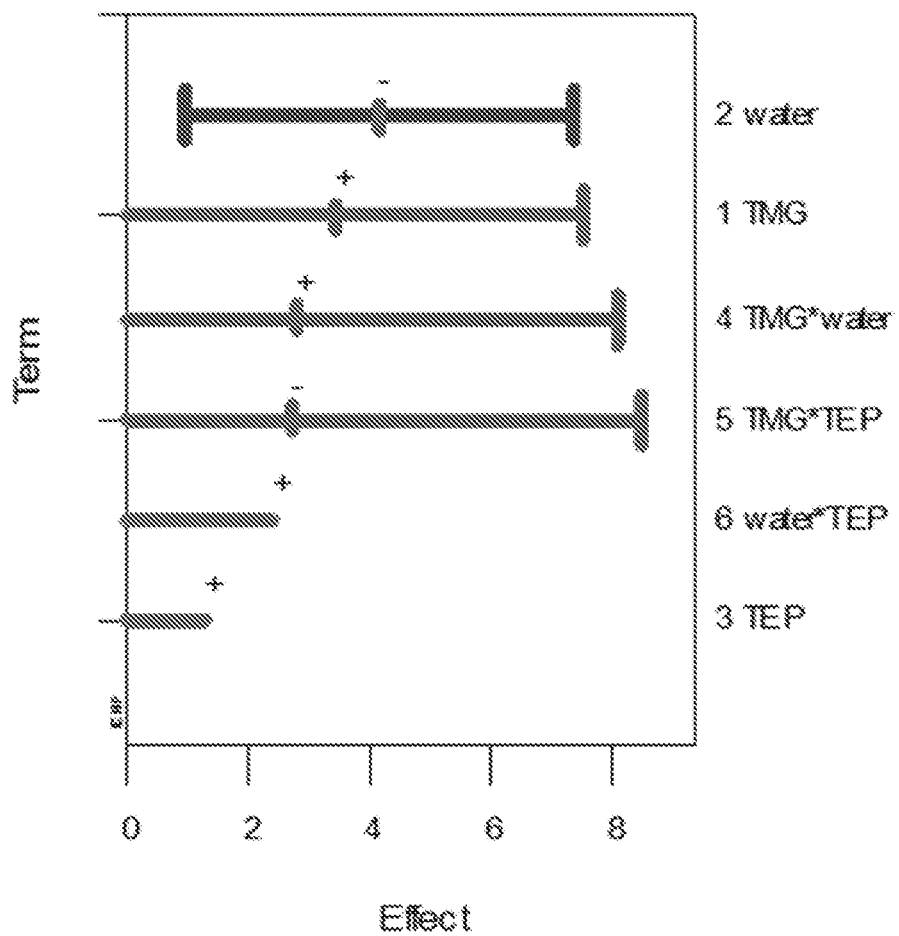
FIG. 4 is a visualization of the Pareto effects for compressive strength.

Water is the only statistically significant variable affecting compressive strength and the effect is negative as shown in FIG. 4. However, TMG and the cross product of TMG and water are almost statistically significant and both are a

TABLE 7

| Components | Example 39 Part A | Example 39 Part B | Example 40 Part A | Example 40 Part B | Example 41 Part A | Example 41 Part B |
|---|---|---|---|---|---|---|
| Tripropylene glycol diacrylate 306F | 10.00% | | 5.00% | | 2.50% | |
| Trimethylolpropane triacrylate 351H | 67.00% | | 72.00% | | 74.50% | |
| AATMP (Michael donor) | | 69.500% | | 70.00% | | 70.00%% |
| Polysiloxane polyalkylene oxide copolymer (surfactant) | 2.50% | 1.05% | 2.50% | 1.05% | 2.50% | 1.05% |
| TMG (Catalyst) | | 6.00% | | 6.00% | | 6.00% |
| triethyl phosphate (TEP, aprotic polar solvent) | | 2.00% | | 2.00% | | 2.00% |
| Solstice LBA (physical blowing agent) | 20.00% | 20.00% | 20.00% | 20.00% | 20.00% | 20.00% |
| Water (protic polar solvent) | | 2.00% | | 2.00% | | 2.00% |
| Total components | 99.50% | 100.55 | 99.50% | 101.05 | 99.50% | 101.05% |
| A:B Ratio | 1.4 | | 1.4 | | 1.4 | |
| Density (pcf)* | 1.75 | | 1.74 | | 1.73 | |
| Compressive Strength (psi)* | 8.82 | | 9.80 | | 12.00 | |

Density and Compressive Strength were measured on 1 liter cup foams with skin. Table 6 provided more examples of foams prepared with low cost acrylates. Again, under the same A:B ratio, the more amount of high functionality acrylate in the formula the higher in the compressive strength, as demonstrated by the increasing compressive strength values from Example 39, Example 40, to Example 41.

Example 3

Figure 2:
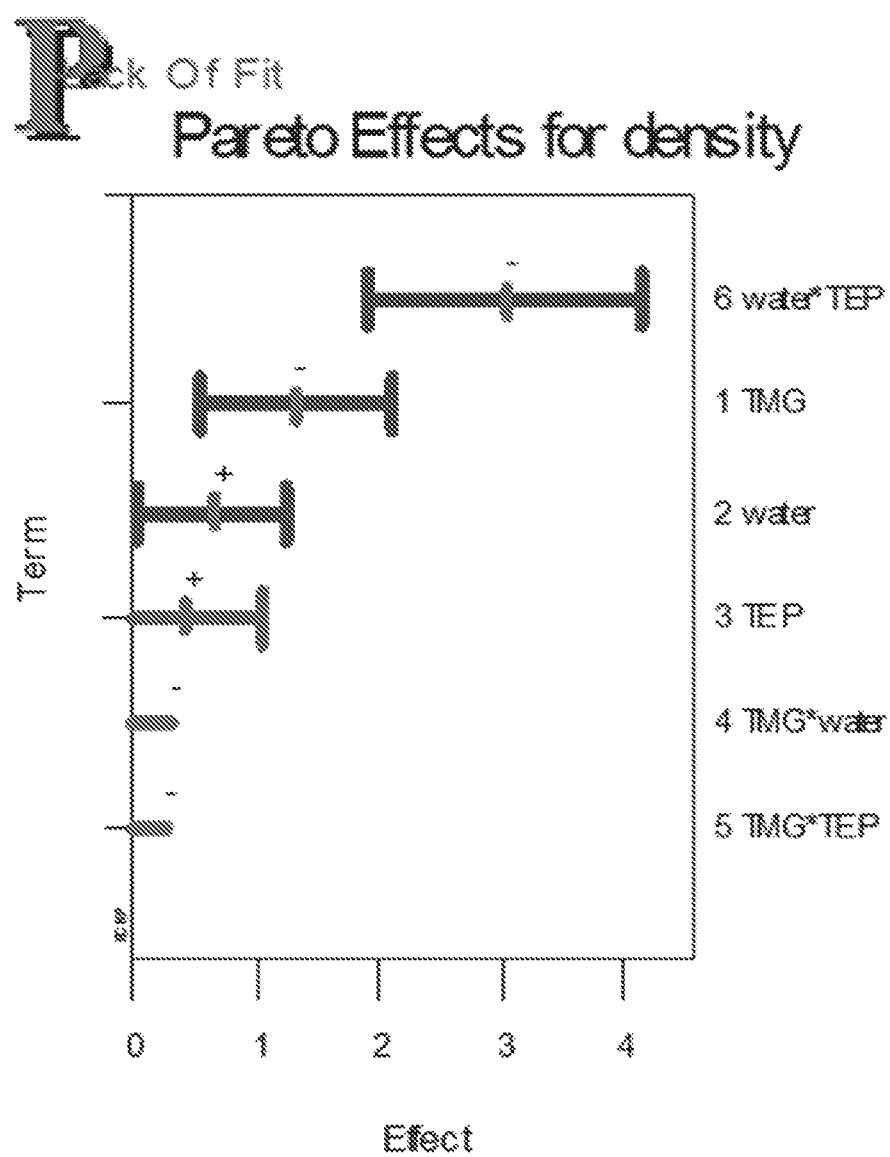
FIG. 2 is a visualization of the Pareto effects for density.
Figure 3:
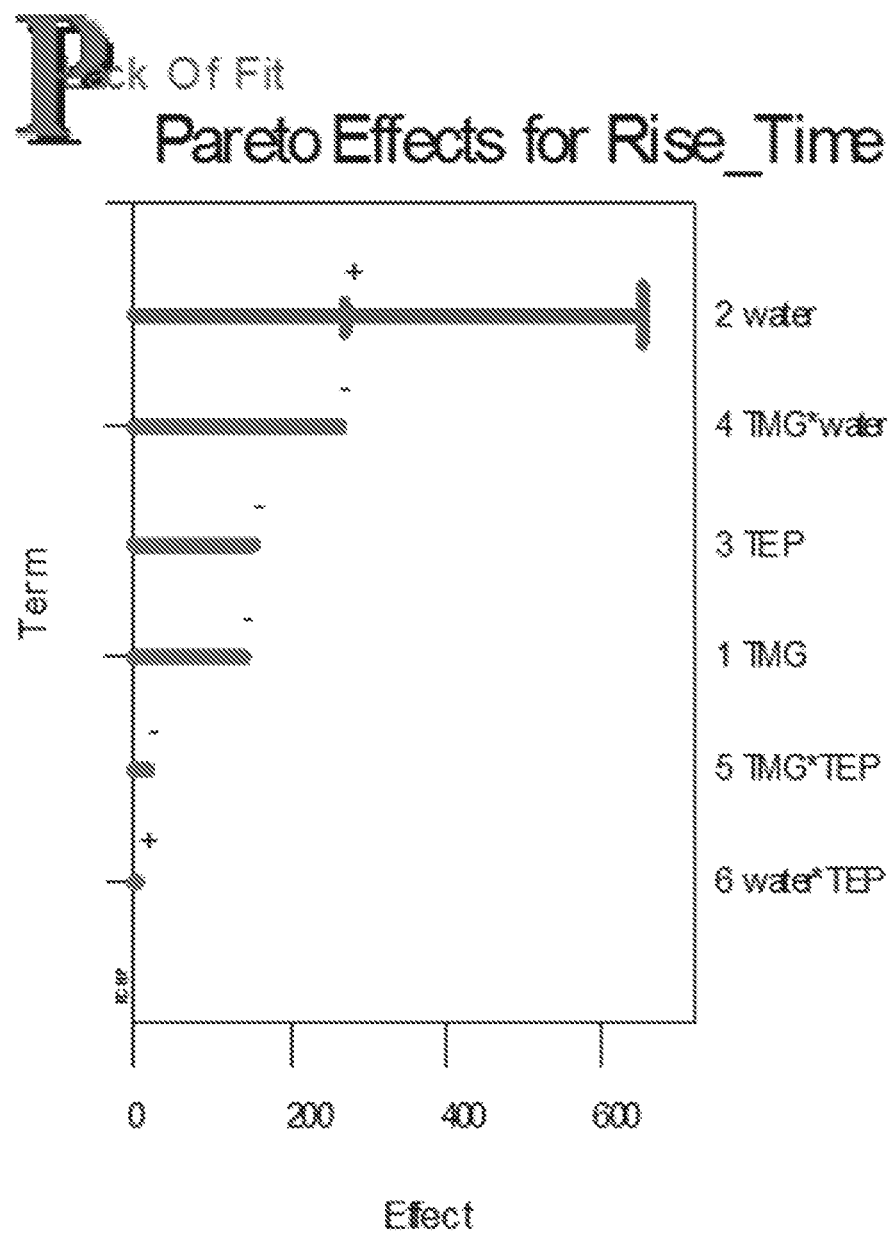
FIG. 3 is a visualization of the Pareto effects for rise time.

A linear interaction model mixture experimental design was conducted with eight unique trials and five replicates. The Pareto Charts in FIGS. 2-4 order the effects from greatest to least. If the range of the effect includes zero it is not statistically significant, but the trend could still be real. There were no significant variables for the rise time response (over the range studied), although water level was almost significant. The effect of water is positive (increases rise time) as shown in FIG. 2.

1,1,3,3-Tetramethylguanidine (TMG) and water are both significant effects on density. Water is positive, that is increases density, whereas TMG is negative (decreases density). Triethylphosphate (TEP) is not significant for density, but the trend is positive. The cross product of water and TEP is significant and negative for density. This indicates an interaction between these two variables. FIG. 2 positive effect. The cross product of TMG and Triethyl Phosphate (TEP) is also almost statistically significant and this effect is negative.

Figure 5:
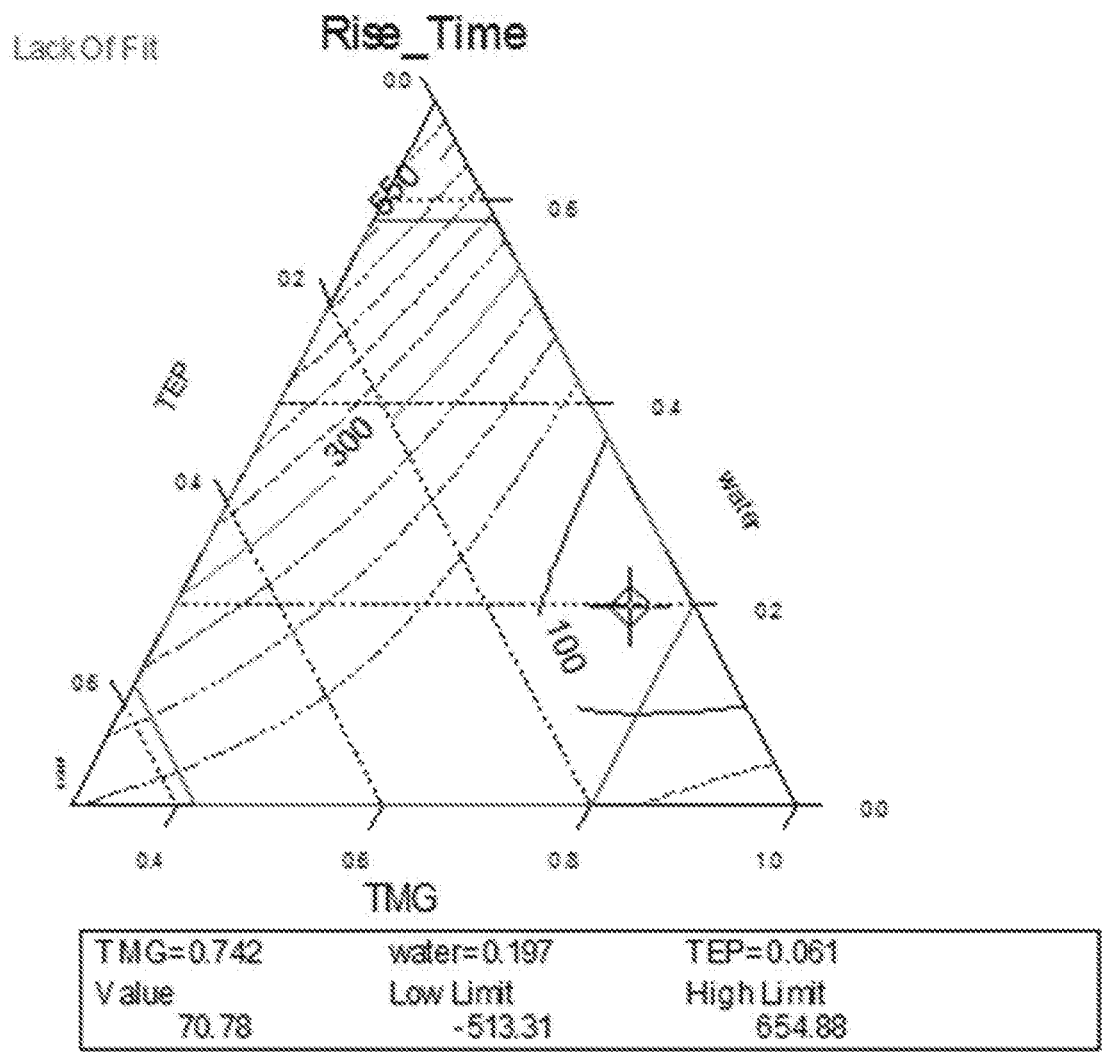
FIG. 5 is a ternary contour plot for rise time.
Figure 6:
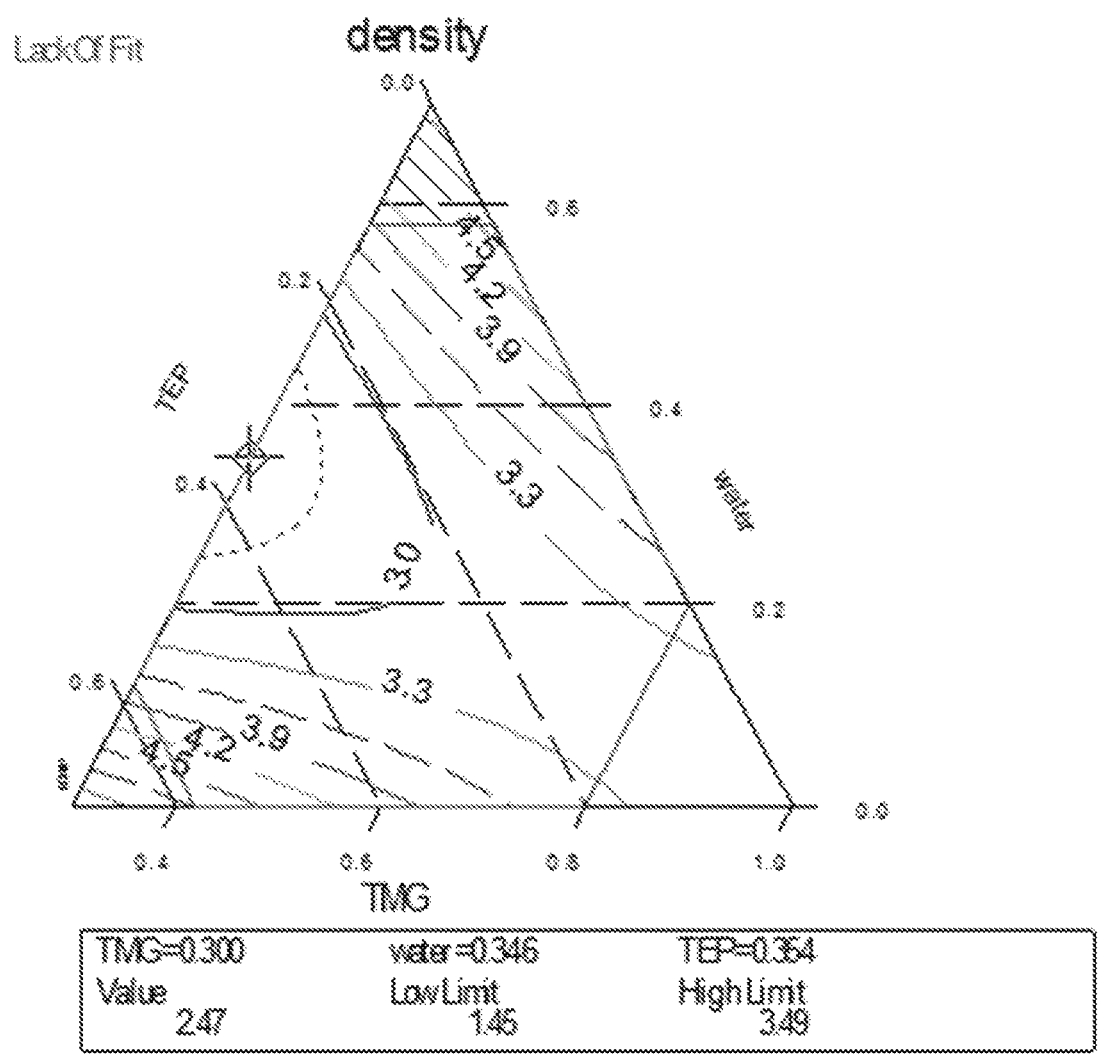
FIG. 6 is a ternary contour plot for density.
Figure 7:
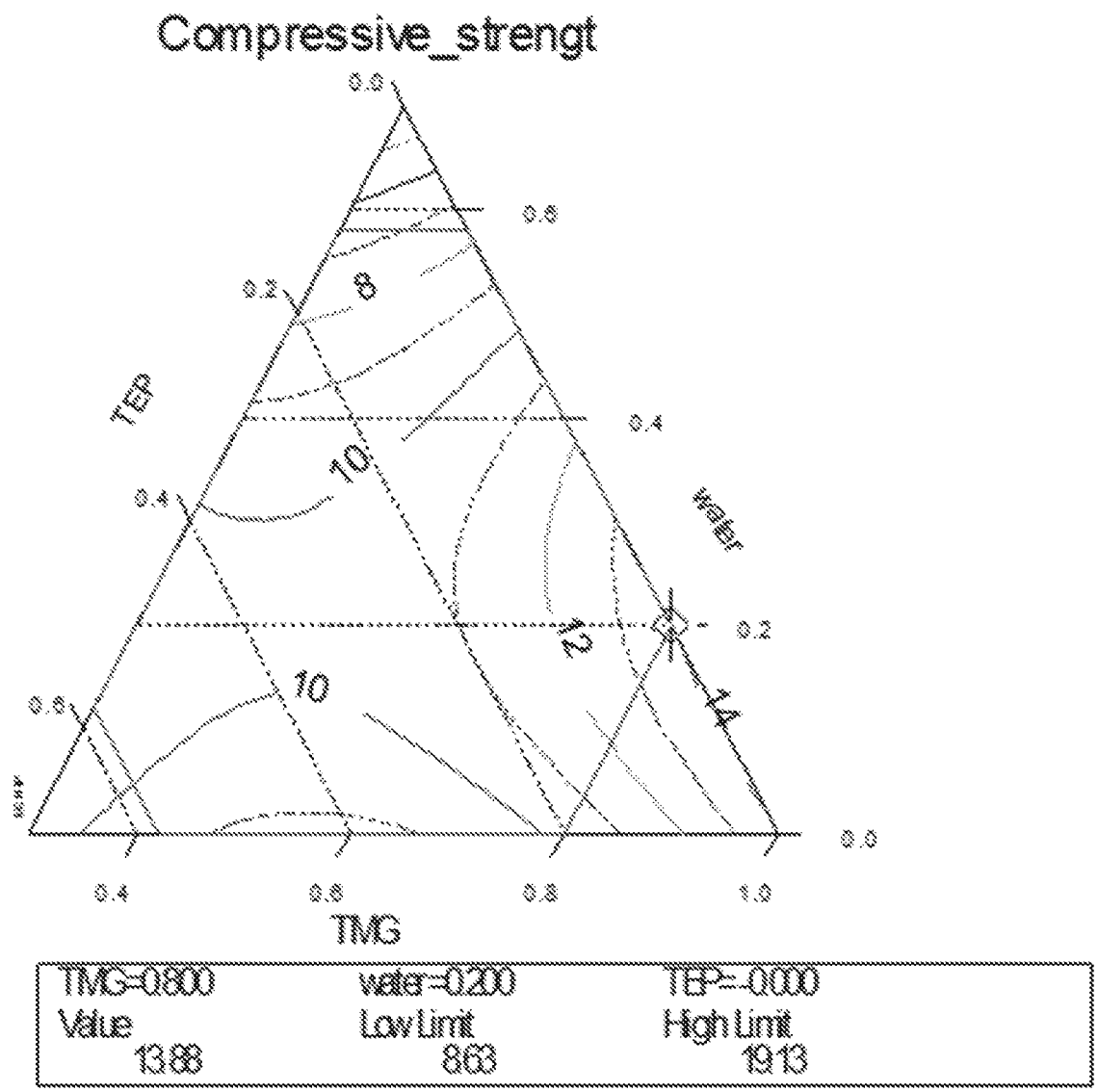
FIG. 7 is a ternary contour plot for compressive strength.
Figure 8:
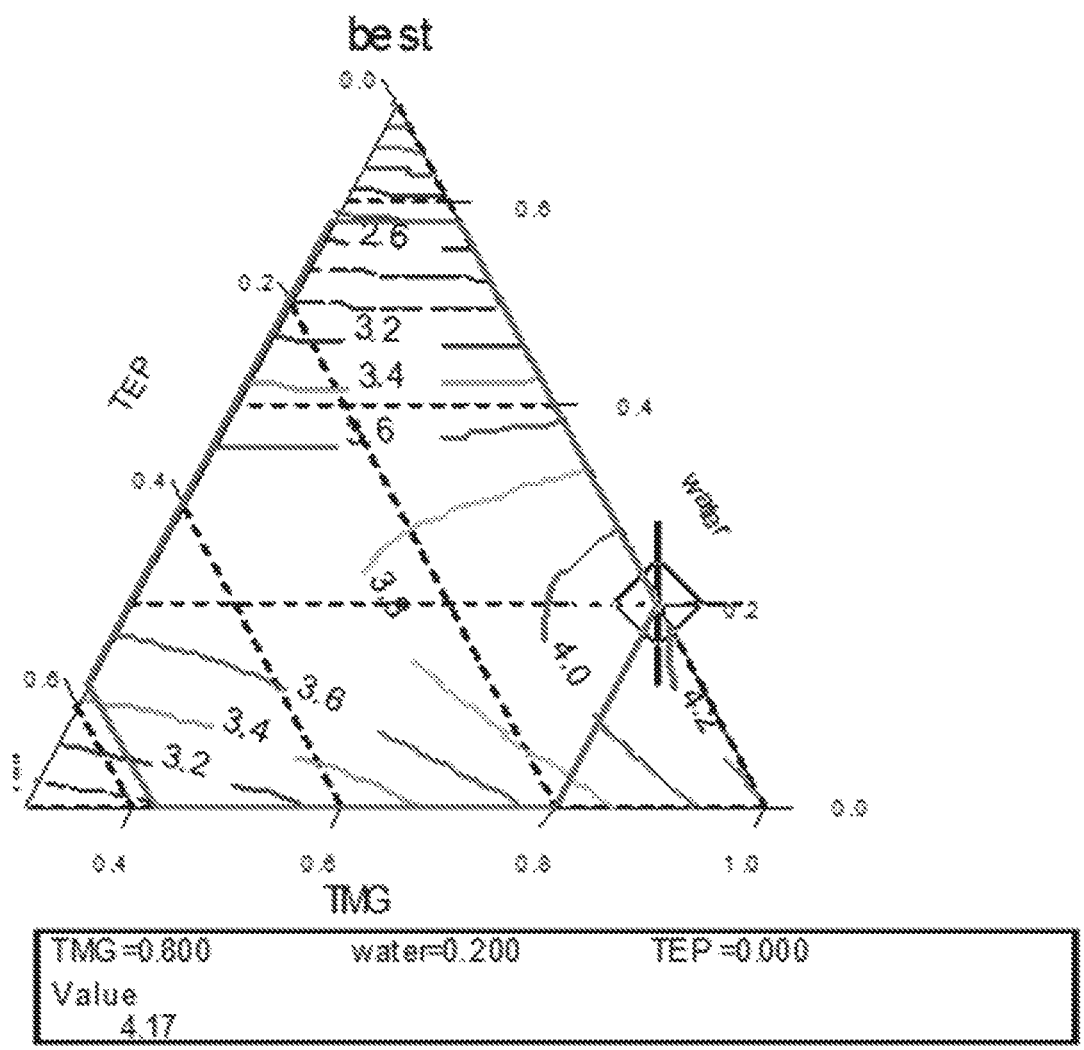
FIG. 8 is a ternary contour plot with combined optimization of rise time, density and compressive strength.
Figure 9:
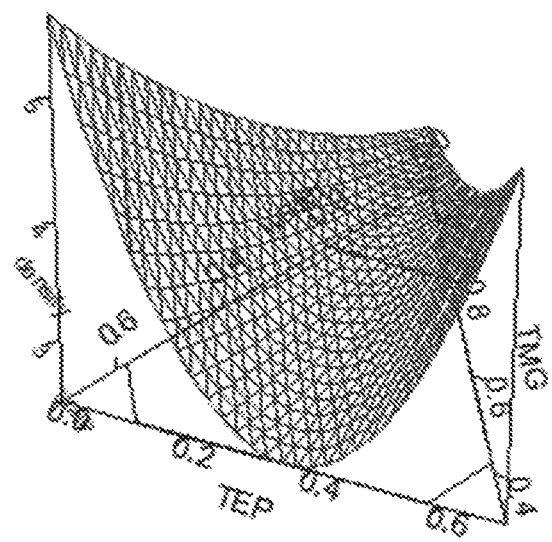
FIG. 9 is a 3-dimensional mesh plot for density.
Figure 10:
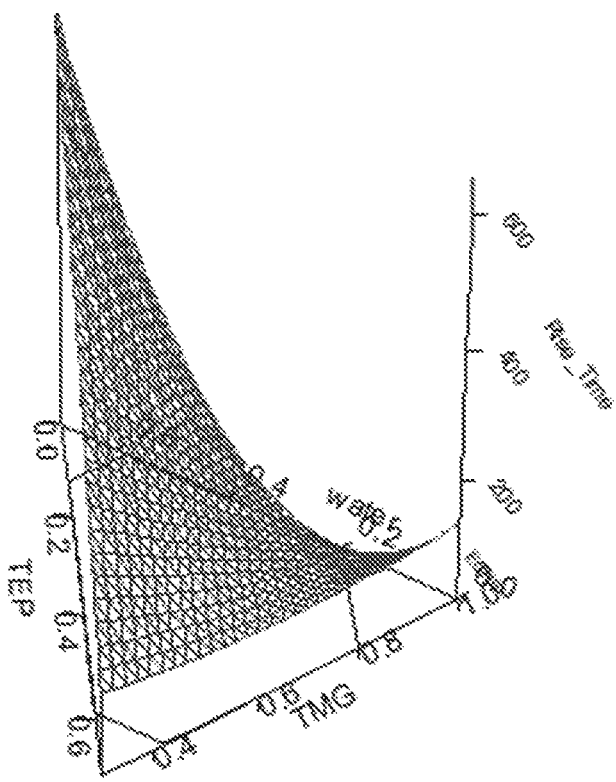
FIG. 10 is a 3-dimensional mesh plot for rise time.

The ternary contour plots are shown in FIGS. 5-7 for each variable. Included is the minimum for rise time (FIG. 5) and density (FIG. 6) and the maximum for compressive strength (FIG. 7). Grid lines with numbers represent statistically significant differences. Dashed contour lines are only to aid in visualizing the curvature. The ternary plot labeled "best", as seen in FIG. 8, is the combined optimization of rise time, density and compressive strength with equal weighting of each. FIGS. 9 and 10 show 3D mesh plots. Some effects are easier to visualize via the 3D mesh. The ternary plot labeled "best", as seen in FIG. 8, is the combined optimization of rise time, density and compressive strength using variables of TEP, water, and TMG. The contour and mesh plots illustrate the interaction of these three variables and what amount of these to select to achieve various properties. The optimized point indicates levels of TMG=0,800, water=0.200, and TEP=0.00.

Example 4

Additional examples were prepared where Part A had the Michael acceptor and Michael donor, and the Part B had the catalyst. Polyols, solvents, and a physical blowing agent were added to Part B. A surfactant was added to Part A.

TABLE 7

| Foam Hardness | Low | | Medium | |
|---|---|---|---|---|
| Example | 41 | | 42 | |
| Components | Part A | Part B | Part A | Part B |
| Trimethylolpropane triacrylate (Michael acceptor) | 56% | | | |
| Dipentaerythritol pentaacrylate (Michael acceptor) | 10% | | 44.8% | |
| Dipropylene glycol diacrylate (Michael acceptor) | | | 6.2% | |
| PEG 400 diacrylate (Michael acceptor) | | | 33% | |
| AATMP (Michael donor) | 48% | | 48% | |
| Polyol - Voranol 415 | | | | 22% |
| Polyol - Multranol 3901 | | 22% | | |
| Polysiloxane polyalkylene oxide copolymer (surfactant) | 3.5% | | 3.5% | |
| TMG (Catalyst) | | 6% | | 6% |
| triethyl phosphate (TEP, aprotic polar solvent) | | 2% | | 2% |
| Solstice LBA (physical blowing agent) | | 40% | | 40% |
| Water (protic polar solvent) | | 2% | | 2% |
| Total components | 117.5% | 72% | 132% | 75.5% |
| A/B Ratio | 1.63 | | 1.75 | |
| Density (pcf)* | 1.35 | | 1.82 | |
| Compressive Strength (psi)* | 1.45 | | 4.94 | |

Example 41 resulted in low foam hardness with a density of 1.35 pcf and a compressive strength of 1.45 psi. Example 42 resulted in medium foam hardness with a density of 1.82 pcf and a compressive strength of 4.94 psi.

We claim:

1. A method of making a foam, the method comprising: providing a formulation comprising:
    a first part comprising 50 wt % to 90 wt % of at least one multifunctional carbon Michael acceptor with respect to the first part and 30 wt % to 60 wt % of at least one multifunctional carbon Michael donor with respect to the first part;
    a second part comprising at least one carbon Michael addition catalyst, and 1 wt % to 5 wt % of at least one solvent with respect to the second part; and
    the formulation further comprising, in at least one of the first or second parts, a blowing agent, and 0.5 wt % to 5 wt % of at least one surfactant with respect to a part comprising the at least one surfactant;
    combining the first part and the second part; and
    curing the formulation to produce a foam.

2. The method of claim 1, further comprising at least one polyol in at least one of the first or second parts.

3. The method of claim 1, wherein the first part has at least one first solvent that is a protic polar solvent and at least one second solvent that is an aprotic polar solvent and the second part has at least one solvent that is a protic polar solvent.

4. The method of claim 1, wherein the first part has at least one first solvent that is a protic polar solvent and at least one second solvent that is an aprotic polar solvent and the second part has at least one solvent that is an aprotic polar solvent.

5. The method of claim 1, wherein the first part has at least one first solvent that is a protic polar solvent and at least one second solvent that is an aprotic polar solvent and the second part has at least one first solvent that is an aprotic polar solvent and at least one second solvent that is a protic polar solvent.

6. The method of claim 1, wherein the first part has at least one first solvent that is an aprotic polar solvent and at least one second solvent that is an aprotic polar solvent and the second part has at least one first solvent that is an aprotic polar solvent and at least one second solvent that is a protic polar solvent.

7. The method of claim 1, wherein the formulation has a ratio of at least one multifunctional carbon Michael acceptor to at least one multifunctional carbon Michael donor of 0.9 to 1.6.

8. The method of claim 3, wherein the aprotic polar solvent is triethyl phosphate and the protic polar solvent is water.

9. The method of claim 1, wherein the at least one multifunctional carbon Michael acceptor is at least one multifunctional acrylate.

10. The method of claim 9, wherein the at least one multifunctional acrylate comprises at least one member selected from the group consisting of polypropylene glycol diacrylate, dipropylene glycol diacrylate, dipentaerythritol pentaacrylate, dipentaerythritol hexaacrylate, polyethylene glycol diacrylate, PEG 400 diacrylate, PEG 600 diacrylate, trimethylolpropane triacrylate, ethoxylated trimethylolpropane triacrylate, tripropylene glycol diacrylate, di(trimethylolpropane) tetraacrylate, pentaerythritol tetraacrylate, pentaerythritol triacrylate, bisphenol A glycolate diacrylate, ethoxylated bisphenol A diacrylate, polyethylene glycol dimethacrylate, ethoxylated neopentyl glycol diacrylate, epoxy acrylates, polyester acrylate.

11. The method of claim 1, wherein the at least one multifunctional carbon Michael donor comprises at least one member selected from the group consisting of acetoacetate esters and acetoacetamides.

12. The method of claim 1, wherein the at least one multifunctional carbon Michael donor is propane-1,1,1-triyltrimethyl tris(acetoacetate).

13. The method of claim 1, wherein the second part further comprises a physical blowing agent comprising at least one member selected from the group consisting of 1,1,1,4,4,4-hexafluorobut-2-ene, 1,1,1,3,3-pentafluoropropane, trans-1-chloro-3,3,3-trifluoropropene, 2,3,3,3-tetrafluoropropene, trans-1,3,3,3-tetrafluoropropene, methyl acetate, pentane, butane, isobutane, dimethyl ether, isobutene, and dimethoxymethane.

14. The method of claim 1, wherein the at least one carbon Michael addition catalyst comprises at least one member selected from the group consisting of 1, 1,3,3-tetramethylguanidine, 1, 8-diazabicyclo[5.4.0]undec-7-ene, 1,5-diazabicyclo[4.3.0]non-5-ene, 1,3,5-Triazabicyclo[4.4.0] dec-5-ene, tetrabutylammonium hydroxide, and aqueous potassium hydroxide.

15. The method of claim 1, wherein the foam has a compressive strength of less than 5 psi_and a density of less than 1.7 pcf.

16. A package comprising:
    a first compartment comprising a first part of a formulation comprising 50 wt % to 90 wt % of at least one multifunctional carbon Michael acceptor with respect to the first part and 30 wt % to 60 wt % of at least one multifunctional carbon Michael donor with respect to the first part;
    a second compartment comprising a second part of a formulation comprising at least one carbon Michael addition catalyst, 1 wt % to 5 wt % of at least one solvent with respect to the second part; and in at least one of the first part of a formulation and the second part of a formulation 0.5 wt % to 5 wt % of at least one surfactant with respect to a part comprising the at least one surfactant, wherein the first and second compartments are separated by a seal.

17. The package of claim 16, wherein the seal is a frangible seal.

18. A method of making a foam comprising:
   providing a package comprising:
   - a first compartment comprising a first part of a formulation comprising 50 wt % to 90 wt % of at least one multifunctional carbon Michael acceptor with respect to the first part and 30 wt % to 60 wt % of at least one multifunctional carbon Michael donor with respect to the first part;
   - a second compartment comprising a second part of a formulation comprising at least one carbon Michael addition catalyst, 1 wt % to 5 wt % of at least one solvent with respect to the second part; and in at least one of the first part of a formulation and the second part of a formulation, 0.5 wt % to 5 wt % of at least one surfactant with respect to a part comprising the at least one surfactant; and in at least one of the first part of a formulation or the second part of a formulation a blowing agent, wherein the first and second compartments are separated by a seal; and bursting the seal to combine the first and second formulation parts, wherein the bursting of the seal to combine the first and second parts of the formulation creates a mixture; and curing the mixture to produce a foam.

19. The method of claim 18, wherein the seal is a frangible seal.

* * * * *